(12) United States Patent
Snodgrass et al.

(10) Patent No.: US 9,693,330 B1
(45) Date of Patent: Jun. 27, 2017

(54) WIDEBAND HIGH FREQUENCY BASED PRECISION TIME TRANSFER

(71) Applicant: Rockwell Collins, Inc., Cedar Rapids, IA (US)

(72) Inventors: Timothy E. Snodgrass, Palo, IA (US); Randy W. Nelson, Anamosa, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 48 days.

(21) Appl. No.: 14/814,010

(22) Filed: Jul. 30, 2015

(51) Int. Cl.
*H04J 3/06* (2006.01)
*H04W 56/00* (2009.01)
*H04L 12/26* (2006.01)
*H04L 29/06* (2006.01)

(52) U.S. Cl.
CPC ....... *H04W 56/003* (2013.01); *H04L 43/0864* (2013.01); *H04L 63/20* (2013.01)

(58) Field of Classification Search
CPC .................................................. H04W 56/003
USPC ......................................................... 370/350
See application file for complete search history.

(56) References Cited

U.S. PATENT DOCUMENTS

| | | | | |
|---|---|---|---|---|
| 3,881,154 A * | 4/1975 | Lewis | ...................... | H04B 7/22 342/26 R |
| 5,204,855 A * | 4/1993 | Bebee | ...................... | H04B 7/12 370/436 |
| 5,230,076 A * | 7/1993 | Wilkinson | ........... | H04B 17/309 375/133 |
| 5,349,463 A * | 9/1994 | Hirohashi | .......... | H04B 10/1149 375/211 |
| 2004/0092281 A1 * | 5/2004 | Burchfiel | ............. | H04B 7/0408 455/522 |
| 2006/0214807 A1 * | 9/2006 | Tengshe | ................. | G08B 21/06 340/576 |
| 2007/0263538 A1 * | 11/2007 | Hueck | ............... | H04L 12/40176 370/232 |
| 2007/0273574 A1 * | 11/2007 | Barnum | .............. | G01S 13/0218 342/90 |
| 2008/0320544 A1 * | 12/2008 | Kashalkar | .......... | H04N 21/4436 725/131 |
| 2013/0322456 A1 * | 12/2013 | Ito | ............................ | H04L 7/04 370/400 |

(Continued)

*Primary Examiner* — Mang Yeung
*Assistant Examiner* — Peter G Solinsky
(74) *Attorney, Agent, or Firm* — Angel N. Gerdzhikov; Donna P. Suchy; Daniel M. Barbieri

(57) ABSTRACT

Timing interrogation methods and communication devices utilizing such timing interrogation methods are disclosed. The timing interrogation method may include: sending a round-trip timing interrogation preamble from a first radio node to a second radio node via the ionosphere; receiving a round-trip timing response at the first radio node via the ionosphere from the second radio node; receiving a time of arrival record at the first radio node via the ionosphere from the second radio node, wherein the time of arrival record indicates the time of arrival of the round-trip timing interrogation preamble at the second radio node according to timing information maintained by the second radio node; calculating timing information based on the time of arrival record and a propagation time of the round-trip timing interrogation preamble and the round-trip timing response; and adjusting time information maintained by the first radio node according to the calculated timing information.

20 Claims, 2 Drawing Sheets

(56) References Cited

U.S. PATENT DOCUMENTS

| | | | |
|---|---|---|---|
| 2014/0310392 A1* | 10/2014 | Ho | H04L 69/16 709/223 |
| 2016/0036569 A1* | 2/2016 | Kim | H04J 11/00 370/342 |
| 2016/0183100 A1* | 6/2016 | Xue | H04W 24/02 370/252 |
| 2016/0197669 A1* | 7/2016 | Babich | H04B 7/18504 370/315 |

* cited by examiner

WIDEBAND HIGH FREQUENCY BASED PRECISION TIME TRANSFER

BACKGROUND

Satellite systems, such as the Global Positioning System (GPS), utilize satellites to provide location and precision timing information to GPS receivers. During conditions referred to as anti-access area-denial (A2AD) conditions, however, reception of satellite signals (and hence precision timing information) may be severely limited and/or completely denied. To help determine timing information when satellite access has been denied, alternative non-satellite-dependent systems such as star trackers and/or eLoran may be utilized.

It is noted, however, that existing non-satellite-dependent systems are unable to cover the entire earth and are therefore unable to support transfer of operationally relevant precision time to a location anywhere in the world.

SUMMARY

In one aspect, embodiments of the inventive concepts disclosed herein are directed to a method. The method may include: sending a round-trip timing interrogation preamble from a first radio node to a second radio node via the ionosphere; receiving a round-trip timing response at the first radio node via the ionosphere from the second radio node; receiving a time of arrival record at the first radio node via the ionosphere from the second radio node, wherein the time of arrival record indicates the time of arrival of the round-trip timing interrogation preamble at the second radio node according to timing information maintained by the second radio node; calculating timing information based on the time of arrival record and a propagation time of the round-trip timing interrogation preamble and the round-trip timing response; and adjusting time information maintained by the first radio node according to the calculated timing information.

In a further aspect, embodiments of the inventive concepts disclosed herein are directed to a method. The method may include: receiving a round-trip timing interrogation preamble sent from a first radio node to a second radio node via the ionosphere; recording a time of arrival record at the second radio node, wherein the time of arrival record indicates the time of arrival of the round-trip timing interrogation preamble at the second radio node according to timing information maintained by the second radio node; sending a round-trip timing response from the second radio node to the first radio node via the ionosphere; and sending the time of arrival record from the second radio node to the first radio node via the ionosphere.

In another aspect, embodiments of the inventive concepts disclosed herein are directed to a radio. The radio may include at least one transmitter-receiver and at least one processor in communication with the at least one transmitter-receiver. The at least one processor may be configured to initiate a timing interrogation process utilizing the at least one transmitter-receiver. The timing interrogation process may include: send a round-trip timing interrogation preamble from the radio to at least one other radio via the ionosphere; receive a round-trip timing response from the at least one other radio via the ionosphere; receive a time of arrival record from the at least one other radio via the ionosphere, wherein the time of arrival record indicates the time of arrival of the round-trip timing interrogation preamble at the at least one other radio according to timing information maintained by the at least one other radio; calculate timing information based on the time of arrival record and a propagation time of the round-trip timing interrogation preamble and the round-trip timing response; and adjust time information maintained by the radio according to the calculated timing information.

It is to be understood that both the foregoing general description and the following detailed description are exemplary and explanatory only and are not restrictive of the inventive concepts disclosed and claimed herein. The accompanying drawings, which are incorporated in and constitute a part of the specification, illustrate embodiments of the inventive concepts and together with the general description, serve to explain the principles and features of the inventive concepts disclosed herein.

BRIEF DESCRIPTION OF THE DRAWINGS

The numerous objects and advantages of the inventive concepts disclosed herein may be better understood by those skilled in the art by reference to the accompanying drawings, in which.

DETAILED DESCRIPTION

Reference will now be made in detail to exemplary embodiments of the inventive concepts disclosed herein, examples of which are illustrated in the accompanying drawings.

Embodiments in accordance with the inventive concepts disclosed herein are directed to timing interrogation methods and communication devices utilizing such timing interrogation methods. More specifically, a wideband high frequency (WBHF) waveform may be combined with timing interrogation methods in accordance with the inventive concepts disclosed herein to facilitate transfer of precise knowledge of time. As will be described in details below, the timing interrogation methods and communication devices utilizing such timing interrogation methods may be utilized to transfer precise knowledge of time from one device to another device located anywhere in the world without utilization of any satellite.

Figure 1:
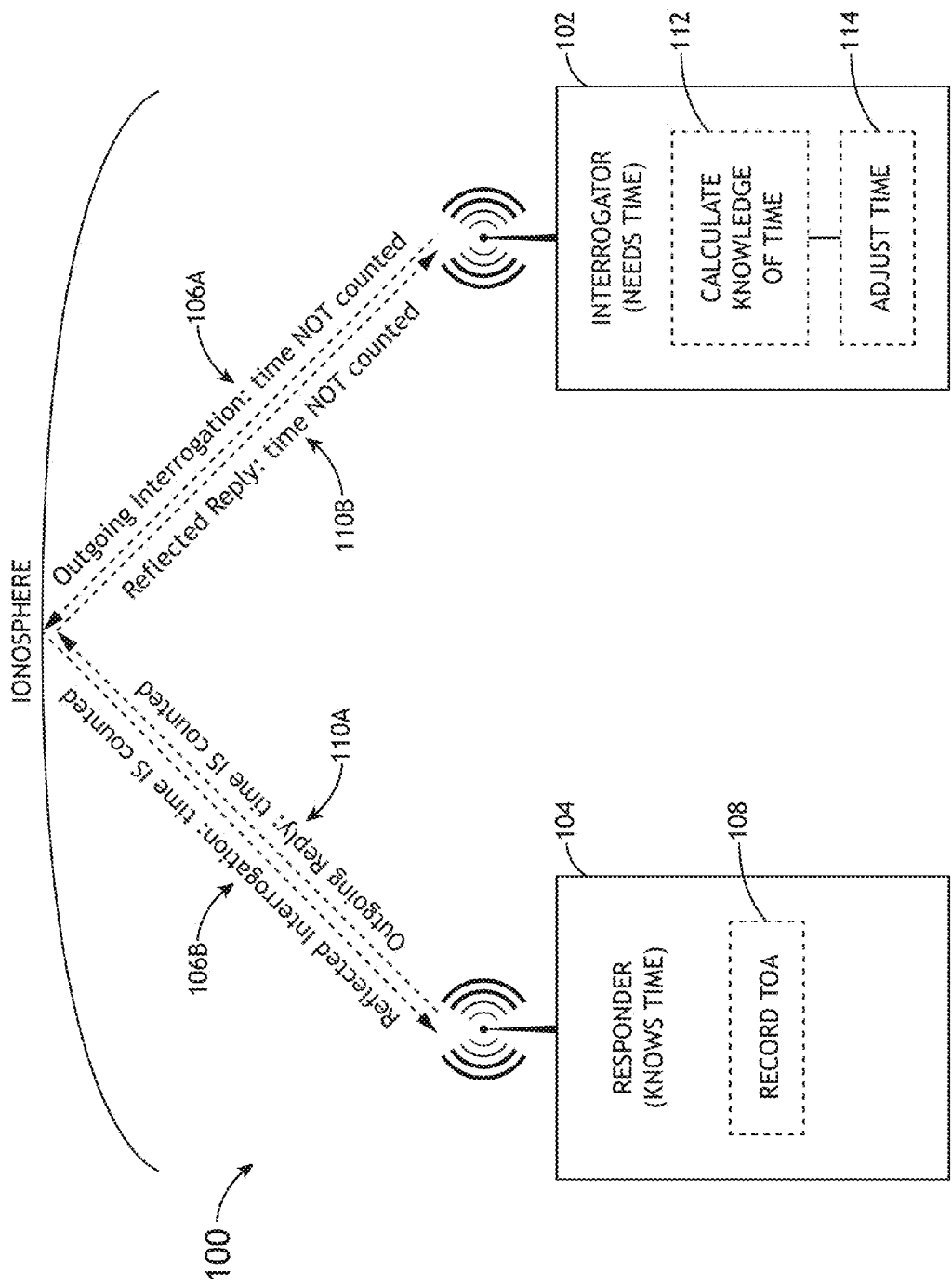
FIG. 1 is an illustration depicting a timing interrogation method according to an exemplary embodiment of the inventive concepts disclosed herein.

Referring to FIG. 1, an illustration depicting a timing interrogation method 100 carried out between two radio nodes 102 and 104 within a communication system is shown. More specifically, each node 102 and 104 within the communication system may maintain a clock that indicates a standard time (e.g., Coordinated Universal Time or the like) with a predetermined fixed time update period (e.g., every 1-second). If a node (e.g., node 102) realizes that its knowledge of time has degraded, that node 102 may need to query some other nodes within the communication system to obtain their knowledge of time. Obtaining the knowledge of time from other nodes may help the node 102 determine how far its 1-second time marks have drifted, which may in turn help the node 102 make appropriate corrections.

To help the node 102 make this determination, the node 102 may first attempt to locate one or more nodes 104 that have (or have access to) the knowledge of time. It is contemplated that the node 102 may utilize various techniques to locate the one or more nodes 104 with the knowledge of time. For instance, standard HF waveform tools such as Automatic Link Establishment (e.g., 4th Generation ALE), Wideband HF Signals in Space (SIS), as well as other techniques may be utilized to locate the one or more nodes 104 without departing from the broad scope of the inventive concepts disclosed herein.

As shown in FIG. 1, suppose the node 102 has located a particular node 104 with the knowledge of time, a round-trip timing (RTT) interrogation technique may then be initiated to facilitate transfer of the knowledge of time from the node 104 to the node 102. For instance, the node 102 may send an outgoing interrogation message to the node 104 in a step 106, and upon receiving such an interrogation message, the node 104 may send a response back to the node 102 in a step 110, allowing the knowledge of time to be transferred from the node 104 to the node 102.

Also as shown in FIG. 1, both the outgoing interrogation message and the response may be sent upwards and may refract off of the ionosphere to support long distance communication. To overcome any potential effects of ionospheric scintillation, the timing interrogation method 100 in accordance with the inventive concepts disclosed herein may implement a short burst RTT interrogation technique. With short burst RTT interrogation, messages utilized to facilitate timing interrogation may be kept sufficiently short so that they fit inside a time frame where the scintillation effects can be considered negligible (or non-existent). It is contemplated that this time frame may be predetermined based on the coherence bandwidth of a scintillating HF channel. For example, if it is determined that the coherence bandwidth of a scintillating HF channel in the mid latitudes is 10 Hz, it means that the path of a particular refraction may remain constant for about 100 milliseconds, after which the refraction properties may change. Therefore, in this example, 100 milliseconds may be determined to be the time frame where the scintillation effects can be considered negligible.

To keep the messages short, the node 102 (may be referred to as the interrogator 102 for clarity) may transmit a short burst RTT interrogation preamble that contains no data in the step 106. In certain implementations, the short burst RTT interrogation preamble may be coded using transmission security, or TRANSEC, for security purposes, and the header information may be omitted entirely, making the short burst RTT interrogation preamble a data-less and header-less TRANSEC sequence that serves the purpose of timing interrogation. It is contemplated that the structure of this short burst RTT interrogation preamble may be set according to the initial 32-bit synchronization preamble of the WBHF message standard. It is noted that 32 bits may be considered a reasonable length to insure a unique correlation with respect to noise, yet not too long to unnecessarily consume the transmission time. It is to be understood, however, that the length of the short burst RTT interrogation preamble may vary without departing from the broad scope of the inventive concepts disclosed herein.

When the node 104 (may be referred to as the responder 104 for clarity) receives the short burst RTT interrogation preamble, the responder 104 may immediately record the time of arrival (TOA) data in a step 108 based on the knowledge of time maintained by the responder 104. However, instead of sending the TOA data to the interrogator 102 immediately, the responder 104 may be configured to withhold the TOA data and send the TOA data to the interrogator 102 at a later time to avoid competing against a RTT response that needs to be sent within the predetermined time frame (100 milliseconds in the example presented above). In certain implementations, the responder 104 may be configured to send the TOA data after the completion of the short burst RTT interrogation.

The RTT response refers to a message that the responder 104 is configured to send out in response to receiving the short burst RTT interrogation preamble. It is noted that the responder 104 may need some processing time to switch from a receive mode to a transmit mode before the responder 104 is ready to send out the RTT response. To minimize any potential processing time variations during this switch, a predetermined amount of turnaround time may be specified in certain implementations to ensure that the responder 104 has adequate time to handle the switch, and in case the responder 104 is able to complete the switch faster than the predetermined turnaround time, the responder 104 may be forced to wait till the end of the predetermined turnaround time to send out the RTT response. It is contemplated that this predetermined amount of turnaround time may be agreed upon by all nodes participating in the communication system (including the interrogator 102 and the responder 104). In certain implementations, the predetermined amount of turnaround time may be 1 millisecond, but it may vary without departing from the broad scope of the inventive concepts disclosed herein.

The RTT response sent from the responder 104 may be delivered to the interrogator 102 in the step 110. The interrogator 102 may also expect to receive the TOA from the responder 104 as a separate message (as previously mentioned). Based on the RTT response received, the interrogator 102 may determine the amount of time it took to complete the interrogation (commonly referred to as the propagation time), and by knowing both the propagation time and the TOA provided by the responder 104, the interrogator 102 may calculate accurate timing information in a step 112 and adjust its own reference of time (e.g., the time information or the clock maintained by the interrogator 102) accordingly in a step 114.

It is noted that the purpose of keeping the RTT interrogation preamble and the RTT response short as described above is so that they can be transmitted within the time frame where the scintillation effects may be considered negligible. The following example may help illustrate the effectiveness of this approach. More specifically, suppose the interrogator 102 and the responder 104 both implement a relatively low data rate of 1800 bits/second, meaning that it would take the interrogator 102 about 17.8 milliseconds to complete transmission of a 32-bit short burst RTT interrogation preamble. Further suppose that the distance from the interrogator 102 to the ionosphere and from the ionosphere to the responder 104 are both 5000 nautical miles, meaning that it would take about 30.9 milliseconds of propagation time for the RTT interrogation preamble to reach the ionosphere (shown as step 106A in FIG. 1) and another 30.9 milliseconds of propagation time for the RTT interrogation preamble to reach the responder 104 (shown as step 106B in FIG. 1).

Similarly, from the perspective of the responder 104, it would take the responder 104 about 17.8 milliseconds to complete the reception of the 32-bit short burst RTT interrogation preamble, and after a predetermined amount of turnaround time (e.g., 1 millisecond as previously mentioned), the responder 104 may send a RTT response back to the interrogator 102. Continuing with the example above, it would take about 30.9 milliseconds of propagation time for the RTT response to reach the ionosphere (shown as step 110A in FIG. 1) and another 30.9 milliseconds of propagation time for the RTT response to reach the interrogator 102 (shown as step 1108 in FIG. 1).

The following time table provides a summary of these process steps:

| | Process Step | Unit | Time Consumption (milliseconds) |
|---|---|---|---|
| 1 | Preamble transmission | 32 bits | 17.8 |
| 2 | Distance from the interrogator to the ionosphere | 5000 nautical miles | 30.9 (Not Applicable) |
| 3 | Distance from the ionosphere to the responder | 5000 nautical miles | 30.9 |
| 4 | Preamble reception | 32 bits | 17.8 |
| 5 | Turnaround time | 1 millisecond | 1.0 |
| 6 | Distance from the responder to the ionosphere | 5000 nautical miles | 30.9 |
| 7 | Distance from the ionosphere to the interrogator | 5000 nautical miles | 30.9 (Not Applicable) |

It is noted that the propagation time from the interrogator 102 up to the ionosphere and the propagation time from the ionosphere back down to the interrogator 102 (corresponding to steps 106A and 1108 in FIG. 1) do not need to be counted in the coherence time calculations. In other words, the coherence time calculations may start when the RTT interrogation preamble reaches the ionosphere and end when the last bit of the RTT response refracts off of the ionosphere. This means that entries 2 and 7 in the time table presented above are not applicable to the total time consumption calculation. The true total time consumption illustrated in this example is 98.4 milliseconds, which is under the 100-millisecond target, indicating that the short burst RTT interrogation technique in accordance with the inventive concepts disclosed herein is able to support RTT interrogation for distances as far as 10,000 nautical miles apart without being significantly affected by the ionospheric scintillation.

It is to be understood that the specific references to data rates, data lengths, and distances in the examples above are merely exemplary and are not meant to be limiting. The examples are shown to illustrate that the message structure configured in accordance with the inventive concepts disclosed herein allows the interrogation preamble and response to be transferred within the coherence time of an HF channel, and it is contemplated that specific implementations may vary without departing from the broad scope of the inventive concepts disclosed herein. It is estimated that utilizing the timing interrogation method 100 in accordance with the inventive concepts disclosed herein may provide the interrogator 102 with accurate knowledge of time within less than ±100 microseconds of "truth" and can be delivered while maintaining a covert HF signal-to-noise ratio that is 6 dB below the noise floor. It is also noted that this accuracy is not degraded by distance, which may be appreciated in various operational conditions.

It is also to be understood that the specific references to HF and/or WBHF channels in the examples above are merely exemplary and are not meant to be limiting. It is contemplated that the timing messages (e.g., the RTT interrogation preambles and the RTT responses) may be sent using various types of channels and/or modulation techniques without departing from the broad scope of the inventive concepts disclosed herein.

Figure 2:
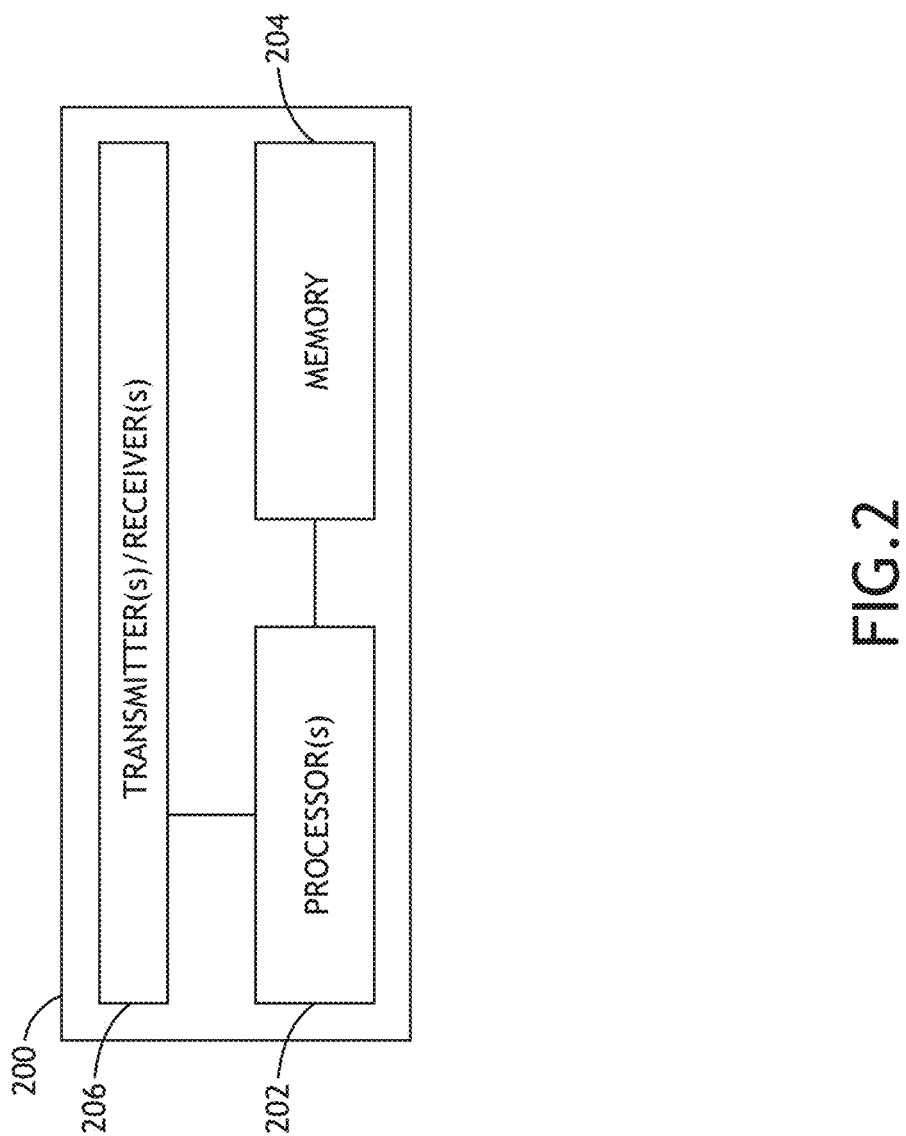
FIG. 2 is a block diagram depicting a radio according to an exemplary embodiment of the inventive concepts disclosed herein.

FIG. 2 is a simplified block diagram depicting an exemplary radio node 200 configured to support the timing interrogation method 100 presented above. As shown in FIG. 2, the node 200 may include one or more processors 202, one or more non-transitory processor-readable memories 204, and one or more transmitters and/or receivers 206. The one or more non-transitory processor-readable memories 204 may be utilized to store processor-executable code. The one or more processors 202 may be implemented as dedicated processing units, application-specific integrated circuits (ASICs), field-programmable gate arrays (FPGAs) or various other types of processors or processing units. When the processor-executable code stored in the one or more non-transitory processor-readable memories 204 is executed by the one or more processors 202, the one or more processors 202 may carry out the various functions and method steps previously described, allowing the node 200 to function as either an interrogator or a responder, depending on the specific operating condition at the time of the execution.

It is to be understood that embodiments of the inventive concepts disclosed herein may be conveniently implemented in forms of a software, hardware or firmware package. Such a package may be a computer program product which employs a computer-readable storage medium including stored computer code which is used to program a computer to perform the disclosed function and process of the inventive concepts disclosed herein. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is to be understood that the specific order or hierarchy of steps in the processes disclosed is an example of exemplary approaches. It is to be understood that the specific order or hierarchy of steps in the processes may be rearranged while remaining within the broad scope of the present disclosure. The accompanying method claims present elements of the various steps in a sample order, and are not meant to be limited to the specific order or hierarchy presented.

It is believed that the inventive concepts disclosed herein and many of their attendant advantages will be understood by the foregoing description, and it will be apparent that various changes may be made in the form, construction, and arrangement of the components thereof without departing from the broad scope of the inventive concepts or without sacrificing all of their material advantages. The form herein before described being merely an explanatory embodiment thereof, it is the intention of the following claims to encompass and include such changes.

What is claimed is:

1. A method, comprising:
   sending a round-trip timing interrogation preamble from a first radio node to a second radio node via the ionosphere;
   receiving a round-trip timing response at the first radio node via the ionosphere from the second radio node, wherein the round-trip timing response contains no time of arrival record;
   receiving a time of arrival record at the first radio node via the ionosphere separately from the second radio node, wherein the time of arrival record indicates the time of arrival of the round-trip timing interrogation preamble at the second radio node according to timing information maintained by the second radio node;

calculating timing information based on the time of arrival record and a propagation time of the round-trip timing interrogation preamble and the round-trip timing response; and adjusting time information maintained by the first radio node according to the calculated timing information.

2. The method of claim 1, wherein the round-trip timing interrogation preamble is data-less and header-less.

3. The method of claim 2, wherein the round-trip timing interrogation preamble is coded using transmission security (TRANSEC).

4. The method of claim 1, wherein the time of arrival record is received at the first radio node after receiving the round-trip timing response.

5. The method of claim 1, wherein the round-trip timing interrogation preamble and the round-trip timing response are transmitted using a high frequency channel.

6. The method of claim 5, wherein the round-trip timing interrogation preamble and the round-trip timing response are transmitted within a coherence time of the high frequency (HF) channel.

7. The method of claim 6, wherein the high frequency channel is a wideband high frequency (WBHF) channel.

8. The method of claim 7, wherein a length of the round-trip timing interrogation preamble coincides with a length of a WBHF synchronization preamble.

9. A method, comprising:
receiving a round-trip timing interrogation preamble sent from a first radio node to a second radio node via the ionosphere;
recording a time of arrival record at the second radio node, wherein the time of arrival record indicates the time of arrival of the round-trip timing interrogation preamble at the second radio node according to timing information maintained by the second radio node;
sending a round-trip timing response from the second radio node to the first radio node via the ionosphere, wherein the round-trip timing response contains no time of arrival record; and
sending the time of arrival record separately from the second radio node to the first radio node via the ionosphere.

10. The method of claim 9, wherein said sending the round-trip timing response is performed precisely a predetermined amount of time after said receiving the round-trip timing interrogation preamble.

11. The method of claim 9, wherein the round-trip timing interrogation preamble is data-less and header-less.

12. The method of claim 11, wherein the round-trip timing interrogation preamble is coded using transmission security (TRANSEC).

13. The method of claim 9, wherein said sending the time of arrival record is performed after completion of said sending the round-trip timing response.

14. The method of claim 9, wherein the round-trip timing interrogation preamble and the round-trip timing response are transmitted using a high frequency channel.

15. The method of claim 14, wherein the round-trip timing interrogation preamble and the round-trip timing response are transmitted within a coherence time of the high frequency (HF) channel.

16. The method of claim 15, wherein the high frequency channel is a wideband high frequency (WBHF) channel.

17. The method of claim 16, wherein a length of the round-trip timing interrogation preamble coincides with a length of a WBHF synchronization preamble.

18. A radio, comprising:
at least one transmitter-receiver; and
at least one processor in communication with the at least one transmitter-receiver, the at least one processor configured to initiate a timing interrogation process utilizing the at least one transmitter-receiver, the timing interrogation process includes:
send a round-trip timing interrogation preamble from the radio to at least one other radio via the ionosphere;
receive a round-trip timing response from the at least one other radio via the ionosphere, wherein the round-trip timing response contains no time of arrival record;
receive a separate time of arrival record from the at least one other radio via the ionosphere, wherein the time of arrival record indicates the time of arrival of the round-trip timing interrogation preamble at the at least one other radio according to timing information maintained by the at least one other radio;
calculate timing information based on the time of arrival record and a propagation time of the round-trip timing interrogation preamble and the round-trip timing response; and
adjust time information maintained by the radio according to the calculated timing information.

19. The radio of claim 18, wherein the at least one processor is further configured to respond to a round-trip timing interrogation preamble received from an interrogator, wherein the at least one processor responds to the round-trip timing interrogation preamble by:
record a time of arrival record indicating the time of arrival of the round-trip timing interrogation preamble received from the interrogator;
send a round-trip timing response to the interrogator via the ionosphere; and
send the time of arrival record to the interrogator via the ionosphere.

20. The radio of claim 18, wherein the round-trip timing interrogation preamble and the round-trip timing response are transmitted using a high frequency channel, and wherein the round-trip timing interrogation preamble and the round-trip timing response are transmitted within a coherence time of the high frequency channel.

* * * * *